(12) United States Patent
Pummer

(10) Patent No.: US 7,855,524 B2
(45) Date of Patent: Dec. 21, 2010

(54) VOLTAGE CONTROL AND POWER FACTOR CORRECTION IN AC INDUCTION MOTORS

(75) Inventor: Alexander Pummer, Pleasanton, CA (US)

(73) Assignees: John E. Powers, Fremont, CA (US); John F. Davis, Irvine, CA (US)

( * ) Notice: Subject to any disclaimer, the term of this patent is extended or adjusted under 35 U.S.C. 154(b) by 0 days.

(21) Appl. No.: 12/608,924

(22) Filed: Oct. 29, 2009

(65) Prior Publication Data

US 2010/0052601 A1 Mar. 4, 2010

Related U.S. Application Data

(62) Division of application No. 12/203,808, filed on Sep. 3, 2008, now Pat. No. 7,638,966.

(51) Int. Cl.
*G05F 1/70* (2006.01)
(52) U.S. Cl. .................. 318/438; 318/727; 318/809; 318/729; 323/300; 323/302; 323/205; 323/329; 327/448; 327/236; 327/248; 327/447; 327/588
(58) Field of Classification Search ............... 318/729, 318/727, 438, 809; 323/302, 205, 208, 209; 327/448, 588, 236, 248, 447
See application file for complete search history.

(56) References Cited

U.S. PATENT DOCUMENTS

| 3,959,719 | A | | 5/1976 | Espelage |
|---|---|---|---|---|
| 4,039,914 | A | * | 8/1977 | Steigerwald et al. ........ 318/375 |
| 4,052,648 | A | | 10/1977 | Nola |
| 4,064,419 | A | | 12/1977 | Peterson |
| 4,151,387 | A | * | 4/1979 | Peters, Jr. ................... 219/626 |
| 4,249,120 | A | | 2/1981 | Earle |
| 4,314,190 | A | * | 2/1982 | Walker et al. ............... 318/798 |
| 4,344,025 | A | | 8/1982 | Okuyama et al. |
| 4,348,631 | A | | 9/1982 | Gyugyi et al. |
| 4,379,258 | A | | 4/1983 | Sugimoto |
| 4,408,149 | A | | 10/1983 | Collins et al. |
| 4,417,190 | A | | 11/1983 | Nola |
| 4,426,609 | A | | 1/1984 | Nagy et al. |
| 4,433,276 | A | | 2/1984 | Nola |
| 4,439,718 | A | | 3/1984 | Nola |
| 4,448,852 | A | | 5/1984 | Bose et al. |
| 4,454,462 | A | | 6/1984 | Spann |
| 4,459,528 | A | | 7/1984 | Nola |

(Continued)

OTHER PUBLICATIONS

Hisayuki Sugimura et al. "Single Phase Utility Frequency AC-High Frequency AC Matrix Converter Using One-Chip Reverse Blocking IGBTs based Bidirectional Switches", KIEE (the Korean Institute of Electrical Engineers) EMECS Conference, 2006, pp. 125-128.*

(Continued)

*Primary Examiner*—Rita Leykin
(74) *Attorney, Agent, or Firm*—Joshua D. Isenberg; JDI Patent

(57) ABSTRACT

A voltage control circuit is disclosed. A power factor corrector may utilize the control circuit to provide power factor correction for an AC induction motor. An AC induction motor system may combine the power factor correct with an AC induction motor.

26 Claims, 10 Drawing Sheets

U.S. PATENT DOCUMENTS

| | | | |
|---|---|---|---|
| 4,459,529 A | | 7/1984 | Johnson |
| 4,581,568 A | | 4/1986 | Fitzpatrick et al. |
| 4,677,364 A | | 6/1987 | Williams et al. |
| 4,688,162 A | * | 8/1987 | Mutoh et al. .................. 363/80 |
| 4,710,692 A | | 12/1987 | Libert et al. |
| 4,767,975 A | | 8/1988 | Unsworth |
| 4,780,660 A | | 10/1988 | Shima et al. |
| 4,833,628 A | | 5/1989 | Curran, Jr. |
| 4,912,390 A | | 3/1990 | Curran, Jr. et al. |
| 4,950,970 A | | 8/1990 | Davis, Jr. et al. |
| 4,954,960 A | | 9/1990 | Lo et al. |
| 5,075,613 A | | 12/1991 | Fisher |
| 5,134,356 A | | 7/1992 | El-Sharkawi et al. |
| 5,162,965 A | * | 11/1992 | Milberger et al. ............. 361/56 |
| 5,187,427 A | | 2/1993 | Erdman |
| 5,241,256 A | | 8/1993 | Hatanaka et al. |
| 5,471,125 A | | 11/1995 | Wu |
| 5,471,127 A | | 11/1995 | Vaughan et al. |
| 5,517,401 A | * | 5/1996 | Kinoshita et al. ............. 363/98 |
| 5,548,203 A | * | 8/1996 | Kemerer et al. ............. 323/210 |
| 5,559,688 A | * | 9/1996 | Pringle ......................... 363/89 |
| 5,561,356 A | | 10/1996 | Nanos |
| 5,635,826 A | * | 6/1997 | Sugawara ................... 323/300 |
| 5,637,975 A | * | 6/1997 | Pummer et al. ............. 318/729 |
| 5,684,377 A | | 11/1997 | Kim et al. |
| 5,723,966 A | | 3/1998 | Straka et al. |
| 5,754,036 A | * | 5/1998 | Walker ....................... 323/237 |
| 5,818,238 A | | 10/1998 | DeVilbiss |
| 5,923,143 A | | 7/1999 | Cosan et al. |
| 6,194,881 B1 | | 2/2001 | Parker et al. |
| 6,281,658 B1 | * | 8/2001 | Han et al. ................... 318/729 |
| 6,954,046 B2 | | 10/2005 | Cashatt |
| 6,980,445 B2 | * | 12/2005 | Fukumoto et al. ............. 363/45 |
| 7,019,498 B2 | | 3/2006 | Pippin et al. |
| 2008/0094021 A1 | | 4/2008 | Garza |

OTHER PUBLICATIONS

Cowern, "Power Factor Correction On Single Induction Motors" Jan 1, 1998 <http://www.ecmweb.com/mag/electric_power_factor_correction/index.html>, 2 pages.

Q. Li and J. J. Cathey, "Input power factor correction, variable-speed, single-phase induction motor control suitable for retrofit applications". International Journal of Electronics, vol. 93. Issue 3 Mar. 2005, pp. 149-165.

Vinaya Skanda, "Integrated Power Factor Correctlon (PFC) and Sensorless Field Oriented Control (FOC) System", Microchip Technology Inc. Jan. 2, 2008, DS01208A-p. 1-22 <http://ww1.microchip.com/downloads/en/AppNotes/01208A.pdf>.

University of Wollongong, "Power Factor Correction and Its Pitfalls", Technical Note No. 2, May 1999, pp. 1-8 <http://www.elec.uow.edu.au/iepqrc/files/technote2.pdf>.

Jun Narushima et al., "Application of Magnetic Energy Recovery Switch (MERS) for Power Factor Correction", IPEC-Niigata 2005, Apr. 4-8, 2005, Toki Masse, Niigata, Japan, 22 pages <http://www.ns.titech.ac.jp/~rshimada/?plugin=attach&refer=2005%C7%AF%C5%D9&openfile=IPEC2005_narushima.pdf>.

Jon Burroughs, "Exploiting Three-phase, Variable-speed AC Induction Motor Capabilities", Microchip, Motor Control for White Goods, Apr. 2007, pp. 30-32, http://www.embedded-control-europe.com/c_ece_knowhow/20/ECEapr07p30.pdf>.

Ralph A. Frye III, P. E., "Power Factor Correction", Wagester & Lease, Inc., Port-Land Systems, Inc., 2003, 3pages <http://www.wagesterlease.com/aboutus/articles/powerfactor.html>.

PFC Engineering, "Big Savings from Power Factor Correction Equipment", Engineeringtalk.com, Mar 5, 2001, 4 pages <http://www.engineeringtalk.com/news/pfc/pfc101.html>.

U.S. Appl. No. 12/203,808 to Alexander Pummer filed Sep. 3, 2008.

Notice of Allowance and Fee(s) Due dated Aug. 11, 2009 for U.S. Appl. No. 12/203,808.

* cited by examiner

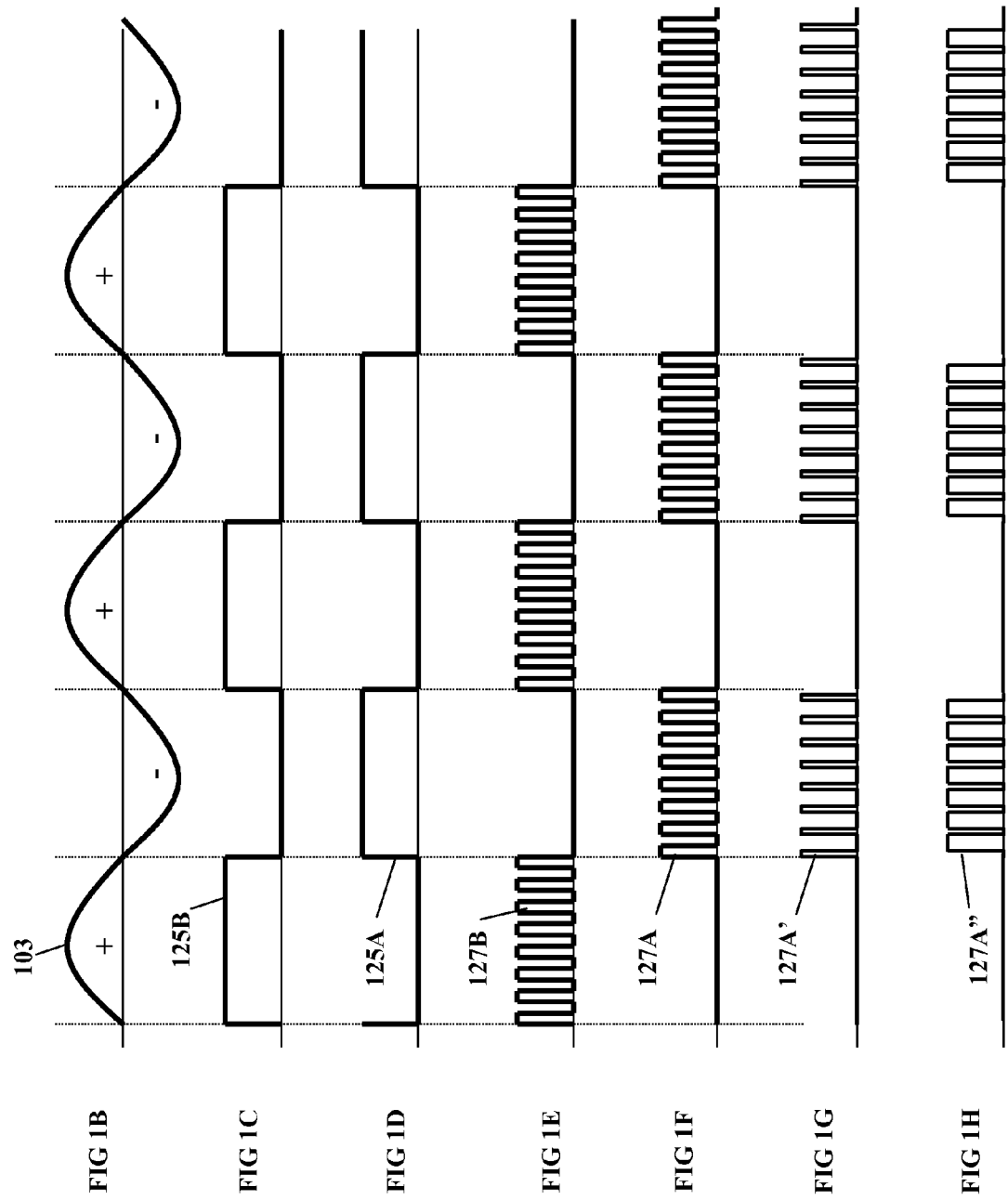

VOLTAGE CONTROL AND POWER FACTOR CORRECTION IN AC INDUCTION MOTORS

CLAIM OF PRIORITY

This application is a divisional application and claims the priority benefit of U.S. patent application Ser. No. 12/203,808 filed Sep. 3, 2008, the entire disclosures of which are incorporated herein by reference.

CROSS-REFERENCE TO A RELATED APPLICATION

This application is related to U.S. patent application Ser. No. 08/343,887, now U.S. Pat. No. 5,637,975, the entire contents of which are incorporated herein by reference.

FIELD OF INVENTION

Embodiments of this invention relate voltage control and more specifically, to power factor correction for alternating current (AC) induction motors.

BACKGROUND OF THE INVENTION

Alternating current (AC) induction motors use a large proportion of a given industrialized country's generated electrical power. It is estimated that roughly 70% of the United States' total generator power is used to power motors. To optimize power consumption, it is often desirable for a motor selected for a given application to be able to drive the largest possible load at the lowest possible line voltage. The relative efficiency of an AC motor may be expressed in terms of a power factor that is related a difference in phase between an AC voltage applied to the motor and an AC current utilized by the motor. The power factor is sometimes expressed as a cosine of the relative phase angle between the AC source voltage and the AC motor current. When the source voltage and motor current are in phase, the phase angle difference is equal to zero and the cosine of the phase angle is equal to 1.

In an AC induction motor, fed power directly from the source, will run optimally (e.g., power factor close to 1) only in the situation where the AC motor has the largest possible load and the source powering the motor is operating at the lowest possible line voltage. As soon as the line voltage begins operating higher than the minimum possible voltage, or the mechanical load is lower than maximum possible load, the motor's power factor will be less than optimal. The average power factor of AC motors used in the United States is about 0.7. This means that as much as 30% of a source's generated power could be lost due to the less than optimal power factor of the AC induction motor. If one considers that approximately 70% of the electric power generated in the United States is derived from fossil fuels, such as coal, natural gas and oil, there is a great need to optimize the operation of all AC induction motors given the current limited nature of the supply of such fuels.

The best way to optimize the power factor is to reduce the motor's supply voltage such that it is proportional to the instantaneous mechanical load of the AC induction motor. The earliest solution to this problem involved compensating a voltage lagging phase-dislocated current driving an AC induction motor with a leading current. This method could improve the power factor from the power supply's point of view, but at the same time this method caused a large current to exist between the motor and the circuit used for compensation. Because of the high costs, low efficiency, and high maintenance of this procedure, this approach was never widely adopted.

Another solution to optimizing the power factor in AC induction motors was developed by Frank Nola, who developed a power factor control system for use with AC induction motors. Nola's power factor control system samples line voltage and current through the motor and decreases the power input to the motor in proportion to the detected phase displacement between the current and voltage (see for example U.S. Pat. Nos. 4,052,648, 4,433,276, and 4,459,528, which are sometimes referred to herein as the Nola patents). This method reduces the power to the motor, as it becomes less loaded. Although Nola's power factor correction method was a big step forward, it had its basic problems. According to Nola's patent, the power of the motor is controlled by silicon-controlled rectifiers, which will turn on following a delay after the zero crossing of the input voltage. The motor's power reduction is proportional to the phase difference between the last zero crossing of the input voltage and the moment of turn on of the silicon controlled switch. For low power factor errors, the system works reasonably well, but as soon as the power factor errors become large, the waveform of the motor current becomes severely distorted. The result is the emergence of harmonics on the input line frequency. Harmonics of a third order will cause the "lifting" of a neutral line, which is unacceptable due to the dangers that it poses.

U.S. Pat. No. 6,194,881 to Parker et al. discloses a switching power supply system that includes first and second AC switches which are operated at alternate intervals with respect to each other to permit current to flow between the AC power line source and the load over intervals of the AC voltage cycle. The system includes an energy storage element (e.g., an inductor) in an output filter that stores energy during intervals of the AC voltage cycle and releases the stored energy during the alternate intervals of the AC voltage cycle. Since the switches are turned on alternatively the timing of the switches is critical to avoid current overlapping or open circuit. For example, if both switches are closed (i.e., "on") there will be a short between the live and neutral lines. If the second switch opens before the first one closes an inductive 'kick' back voltage from the inductor could destroy both switches. Furthermore, the circuit loss is relative high since at any time there are four diodes and two switching elements in the current path.

U.S. Pat. No. 5,635,826 to Sugawara describes an AC power source system that is similar to the one disclosed by Parker in U.S. Pat. No. 6,194,881. In the Suguwara system, a first AC switch provided between input and output sides is on-off operated in a predetermined cycle. A second AC switch is provided on the output side of the first AC switch at a position to short-circuit the output side and on-off operated conversely to the first AC switch. A predetermined pause time is provided between the operations of the first and second AC switches. Each AC switch has two semiconductor elements, and diodes each connected between controlled terminals of and in opposite conduction polarity to each semiconductor element. Like polarity controlled terminals of the two semiconductor elements are connected to each other. The same control signal is supplied to control input terminals of each semiconductor element for on-off switching AC between the other controlled terminals of the semiconductor elements. Like the system described in U.S. Pat. No. 6,194,881, the Sugawara circuit uses alternating switching. Therefore timing of the switching is critical to avoid current overlapping or open circuit. The Suguwara device uses passive dissipative components in a snubber circuit to limit surge currents. However, the passive dissipative components in the snubber circuit tend to limit the efficiency of the circuit.

It is within this context that embodiments of the present invention arise.

BRIEF DESCRIPTION OF THE DRAWINGS

FIGS. 1B-1H are timing diagrams illustrating voltage waveforms input into the voltage control circuit according to an embodiment of the present invention.

DETAILED DESCRIPTION OF THE SPECIFIC EMBODIMENTS

It is an object of this invention to provide an electrical device which, when placed in the circuitry of the power input to an AC induction motor, will effect a reduction of power supplied to the AC induction motor running at a less than optimal power factor. Other objects and advantages will become apparent from the description below.

Figure 1A:
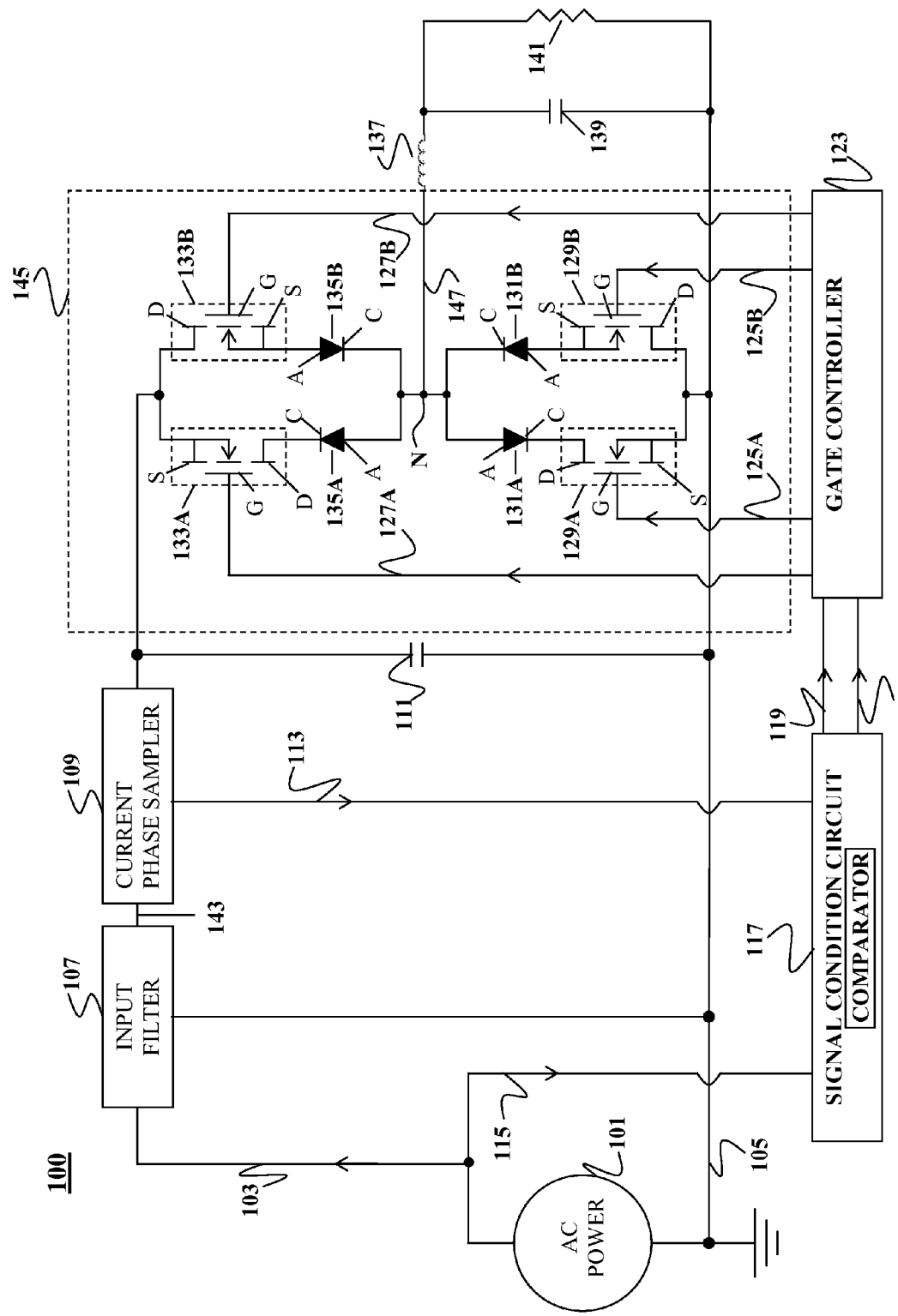
FIG. 1A is an electrical schematic diagram illustrating a power factor corrector system according to an embodiment of the present invention.

FIG. 1A is an electrical schematic diagram of a power factor corrector system 100 according to an embodiment of the present invention. In the example depicted in FIG. 1A, AC electrical power supplied to the system 100 by an AC source 101 is of a single phase and exits the AC source 101 via a "live" line 103 and returns to the AC source via a neutral line 105. The live AC voltage 103 is fed into an input filter 107 which may be designed as a low pass filter. The input filter 107 removes transients and high frequency noise from the incoming AC voltage 103 and provides a filtered AC voltage 143 having an optimal attenuation of the AC voltage on the live line 103. The filtered AC voltage 143 is fed from the filter 107 into a current phase sampler 109, which samples the phase of the AC current and generates an output signal that represents this phase information. A capacitor 111 electrically coupled between a current output of the current phase sampler 109 and the neutral line 105 acts as a charge storage device to prevent a voltage control circuit 145 from interfering with the functionality of the current phase sampler 109. The filtered AC voltage 143 is fed from the output of the current sampler to a voltage control circuit 145.

A signal conditioning circuit 117 receives a voltage phase signal 115 directly from the AC source 101, as well as a current phase signal 113 from the current phase sampler 109. The signal conditioning circuit 117 then generates a voltage control signal 119 proportional to a phase dislocation between the input voltage and the input current, as well as an input voltage polarity signal 121. These outputs of the signal conditioning circuit 117 are then fed into a switch control circuit 123. By way of example, the signal conditioning circuit 117 may include a comparator that compares the voltage phase signal 115 to the current phase signal 113 and generates the voltage control signal 119 in proportion to a difference between them.

The switch control circuit 123 receives the voltage control signal 119 and the input voltage polarity signal 121. The switch control circuit 123 then generates two polarity control signals 125A, 125B as well as two pulse-width modulated polarity controlled switch control signals 127A, 127B, which are sometimes referred to herein as chopping signals. The waveforms of these signals are illustrated in FIGS. 1B-1G, with the numerical reference of each waveform being equivalent to the numerical references in FIG. 1A. These 4 signals are sent to the voltage control circuit 145. The input filter 107 prevents the switch control signals 127A, 127B from reaching the AC power source 101 and affecting the AC power system.

The four switching elements 129A, 129B, 133A, and 133B of the voltage control circuit 145 work in a coordinated switching sequence, which results in a chopped sinusoid. Flywheel diodes 131A, 131B are coupled to switches 129A, 129B respectively and diodes 135A, 135B are coupled to switches 133A, 133B respectively. The filtered AC voltage 143 is coupled to the output of switch 133A and the input of switch 133B. Each of the switches 129A, 129B, 133A, and 133B generally includes an input terminal, and output terminal and a control terminal. A value of a voltage applied to the control terminal determines whether electric current can flow between the input and output terminals. By way of example, and not by way of limitation, the switches 129A, 129B, 133A, and 133B may be n-channel MOS FETs (metal oxide semiconductor field effect transistors), each having a source S, drain D and gate G as indicated. In such a case, the switch control signals 125A, 125B, 127A, 127B may be applied to the gates G of the switches 129A, 129B, 133A, and 133B, respectively. When the switch control signal has a suitable value, current may flow between from the drain D to the source S of the corresponding switch.

In general, the switching elements 129A, 129B, 133A, and 133B may be any type of solid state switching device that can be turned on and off sufficiently fast compared to the pulse duration of the polarity signals 125A, 125B and chopping signals 127A, 127B and a low voltage drop across the switch in the "on" state. By way of example, and not by way of limitation, the switching elements 129A, 129B, 133A, and 133B may be MOSFETs ((Metal-Oxide-Semiconductor Field-Effect Transistors)), such as n-channel MOSFETs, with source (S) gate (G) and drain (D). Alternatively, the switching elements 129A, 129B, 133A, and 133B may be Insulated Gate Bipolar Field Effect Transistors (IGBFETs). It is noted that in the circuit shown in FIG. 1A, the switching devices 129A, 129B, 133A, 133B may be turned on and off with electrical control signals. The silicon controlled switches used in the device described in the Nola patents, by contrast, could be turned on with electrical control signals, but could not turned off with electrical control signals.

It is noted that the diodes 135A, 135B are optional depending on the type of device used for the switching elements 133A, 133B. Specifically, the diodes 135A, 135B are required for certain switching devices, e.g., n-channel MOSFETs that have a "body diode". In particular, the diodes 135A and 135B are used in the case of n-channel MOSFETs that have body diodes parallel to the source drain path that are reverse polarized relative to the polarization of the source drain path, i.e., they conduct if the n-channel device's source is positive and the drain is negative relative to the source. Where the switching elements 133A and 133B are other type of switches that do not contain elements similar to MOSFET body diodes, the diodes 135A and 135B are not required.

The input terminal of switch 129A is coupled to a cathode C of flywheel diode 131A and the output terminal of switch 129B is coupled to an anode A of flywheel diode 131B. The input terminal of switch 133A is coupled to a cathode C of diode 135A and the output terminal of switch 133B is coupled to an anode A of diode 135B. One terminal of a choke inductor 137 is electrically coupled to an output 147 of the voltage control circuit 145 located at a node N (or an electrically equivalent point) that is electrically coupled to the anodes A of diodes 131A, 135A and the cathodes C of diodes 131B, 135B. A second terminal of the inductor 137 is electrically coupled to a winding of the motor 141 at a "live" terminal of the motor 141. The capacitor 139 is electrically coupled across the motor 141 between the "live" terminal and a neutral terminal.

Operation of the switching elements 129A, 129B, 133A, 133B may be explained as follows. As may be seen from FIGS. 1A-1F, during a positive half period of the line voltage 103, (FIG. 1B) the switch 129B is activated by switching signal 125B (FIG. 1C) for the entire half period, providing a ground path for a flywheel diode 131B. During this half period, switch 133B acts as a chopper in response to chopper signal 127B (FIG. 1E), modifying the input voltage signal into a chopped positive half-period sinusoid signal. Meanwhile, diode 135A prevents the reverse polarization of switch 133A. Also during the positive half period of the line voltage 103, switch 129A is de-activated by switching signal 125A (FIG. 1D). During the negative half period of the line voltage 103, the switch 129A is similarly activated for the entire negative half period, providing a ground path for the flywheel diode 131A. The switch 133A acts as a chopper in response to chopping signal 127A (FIG. 1F), modifying the input voltage signal into a chopped negative half-period sinusoid signal. Meanwhile, diode 135B prevents the reverse polarization of switch 133B. Also during the negative half period of the line voltage 103, switch 129B is de-activated by switching signal 125B. The "on" time of the chopping signals 127A, 127B may be varied relative to the total period to provide pulse width modulation. An example of a pulse width modulated chopping signal 127A' with a low duty cycle is illustrated in FIG. 1G. An example of a pulse width modulated chopping signal 127A" with a low duty cycle is illustrated in FIG. 1H.

As may be seen from FIG. 1B and FIGS. 1C-1D, the frequency of the polarity signals 125A, 125B applied to the control terminals of switching elements 129A, 129B is basically the same as the AC line frequency $f_{AC}$ on the live line 103. The chopping frequency $f_c$ of the chopping signals 127A, and 127B applied to the control terminals of the switching elements 133A, and 133B, respectively is a very high multiple of the frequency of the AC voltage on the live line 103. The frequency $f_c$ of the chopping is preferably as high as possible to reduce the size of the input filter 107 and the capacitor 111 of FIG. 1A, e.g., at least 30 times the line frequency of the AC voltage 103, so that the magnetic components of the system 100 and the input filter 107 may be reasonably small and low cost. For example, assume a 60 Hz line frequency and a chopping frequency of 60 kHz. A 60 kHz filter is typically about 1/1000 the size of a 60 Hz filter. The residuals of the 60 kHz chopping at the output may be less than 1% of the line voltage.

The upper limit of the chopping frequency $f_c$ is set by the switching time of the switching elements 133A, 133B. The switching time of the switching elements 133A, 133B is preferably not more than 1/20 of the period of the switching frequency $f_c$. Practical values for the chopping frequency $f_c$ may range, e.g., from 1.5 kHz to 200 kHz. The resulting chopped sinusoid output 147 is electrically coupled to a winding of the motor 141 via the choke inductor 137. The choke inductor 137 and capacitor 139 act as a low-pass filter that removes the chopping frequency applied by the output of the voltage control circuit 145 from the output voltage 147 applied to a motor 141. As the load on the motor 141 changes, the phase comparator 117 detects a change in phase between the motor current and the line voltage 103 and adjusts the voltage control signal 119 accordingly. The switch control circuit 123 responds to the change in the voltage control signal 119 by adjusting the duty cycle of the chopping signals 127A, 127B in a way that tends to reduce the phase dislocation between the line voltage 103 and the motor current. The resulting voltage across the load 141 (e.g. a single phase AC induction motor or one phase winding of a three-phase AC induction motor) is a sinusoid with an amplitude proportional to the duty cycle of the pulse-width modulated chopper signal 127A, 127B and the mechanical load of the motor 141.

The inductor 137 serves as a current source to the output load impedance of the motor 141. For example, when the switch 133B is on, the current to the inductor 137 increases, inducing a positive voltage drop across the inductor 137 and a lower output supply voltage to the motor 141 relative to the line voltage 103. When the switch 133B is off, the inductor current discharges through diode 131A and switch 129A, inducing a negative voltage drop across the inductor 137. Because one port of the inductor 137 is tied to ground, the other port will have a higher voltage level, which is the target output supply voltage. The capacitor 139 acts as a low-pass filter, reducing voltage ripple as a result of the fluctuating current through the inductor 137. Because the configuration of the control circuit 145, which may be described as a "buck" topology, the circuit is not sensitive to switching pulse timing.

As may be seen from FIG. 1B and FIGS. 1C-1D, the polarity signals 125A, 125B change from low to high or vice versa when the line voltage passes through the zero crossing (e.g., from the positive half period to the negative half period or vice versa). However, if the instantaneous line voltage is at a high level, during a recovery time when one of the flywheel diodes 131A or 131B is still conducting current, a substantially large reverse current pulse can flow across that diode and its corresponding switching device 129A or 129B. This current pulse, sometimes referred to as the crow bar effect, is a consequence of the "buck" topology of the voltage control circuit 145.

Figure 2A:
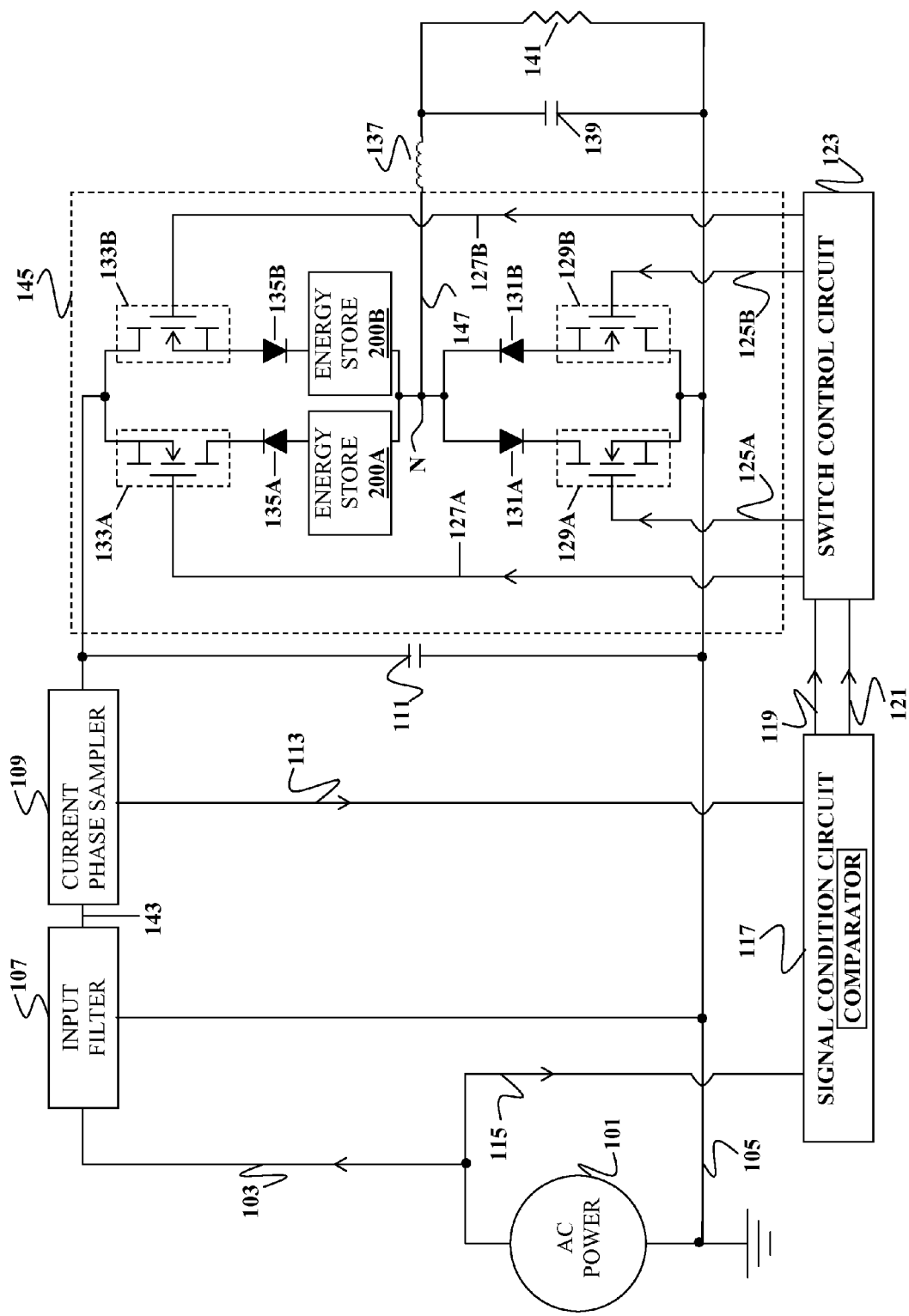
FIG. 2A is an electrical schematic diagram illustrating a power factor corrector with an additional an energy storage device according to an embodiment of the present invention.

According to embodiments of the present invention, the crowbar effect can be avoided by using energy storage circuits 200A, 200B device in the voltage control circuit 145 between the diodes 135A, 135B and the inductor 137 as illustrated in FIG. 2A. Although two energy storage circuits are depicted in FIG. 2A, embodiments of the present invention encompass implementations in which only a single energy storage circuit is coupled between one of the diodes 135A, 135B and the inductor 137.

Figure 2B:
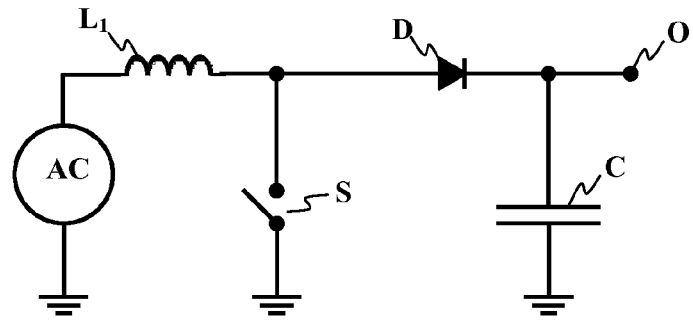
FIG. 2B schematically illustrates a voltage regulator circuit used in power factor correction rectifiers of the prior art.

The energy storage circuits 200A, 200B may each include an energy-storing circuit element. To illustrate the advantages of using an energy-storing circuit element, consider a conventional power factor corrected rectification as illustrated in FIG. 2B. A common feature of both power factor correction and power factor corrected rectification is the usage of a crow bar current prevention circuit, with an energy storage inductor. In the conventional power factor corrected rectification an AC voltage from an AC source is fed to an inductor $L_1$ that is connected to a circuit having a switch S connected between an output of the inductor $L_1$ and ground. A diode D is connected between the output of the inductor $L_1$ and one side of a capacitor C. The other side of the capacitor C is coupled to ground.

The conventional voltage regulator circuit regulates the voltage at an output O by selectively opening and closing the switch S to pulse width modulate the AC voltage from the source. When the switch S is open current flows through the inductor $L_1$ and the diode D and charges the capacitor. When the switch is closed, the capacitor C is supposed to be prevented from discharging by action of the diode D. However, as discussed above, in a real diode there is a finite recovery time after a reverse bias has been applied during which the diode D may still conduct to the present of charge carriers in the diodes suddenly reversed PN junction. During this recovery time, the capacitor C may discharge through the diode D, producing a crowbar current and associated inefficiencies and EMI.

In the prior art, the conventional solution to the crowbar current problem has been to use faster and faster diodes. A faster diode requires a narrower PN junction. Unfortunately, high voltage operation, which is usually the case for power factor correction, requires a wider PN junction. Thus the diode requirements of the conventional crowbar current solution are diametrically opposed to the diode requirements for power factor correction.

Figure 2C:
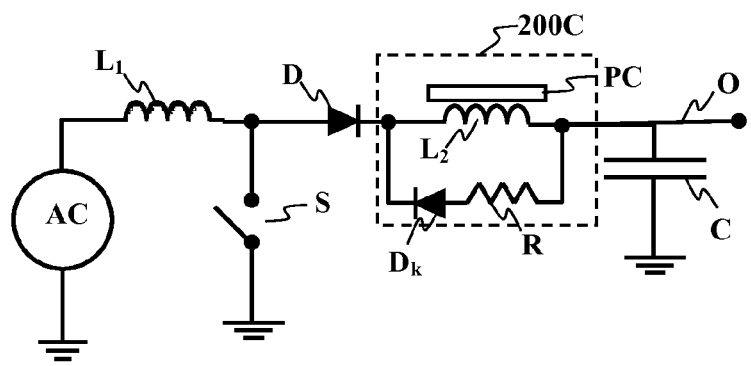
FIG. 2C schematically illustrates a portion of an energy-storing circuit using an inductor and a kickback diode that may be used in a power factor corrector according to an embodiment of the present invention.

To overcome this problem according to an embodiment of the present invention, the voltage regulator circuit shown in FIG. 2B may be modified to include an energy-storing device 200C depicted in FIG. 2C. In this example, the energy-storing device 200C includes an inductor $L_2$ coupled between the switch S and the capacitor C. Although the inductor $L_2$ is depicted as being connected between the switch S and the diode D, it may alternatively be connected between the diode D and the capacitor C provided the inductor $L_2$ is in series with the diode D. By way of example, and without loss generality, the inductor $L_2$ includes a winding W, e.g., a copper coil, wound around a saturable magnetically permeable core PC. The core PC preferably has a permeability that depends on the magnetic field strength of the filed produced by the coil.

The inductor $L_2$ acts to block the crowbar current when the switch S is closed. To appreciate this action, consider the situation when the switch S is open. Current may flow from the AC source through both inductors $L_1$, $L_2$ and the diode D to the output O. Because of the saturable core, there is a voltage drop across the inductor $L_2$. When the switch S is closed, the current is shut off to the energy storing inductor $L_2$. As the stored current in the inductor $L_2$ dissipates to ground through the switch S a reverse bias voltage is induced across the inductor $L_2$ that opposes the crowbar current. The reverse bias voltage dissipates over time. However, if the reverse recovery time of the diode D is shorter than the dissipation time derived from the time voltage integral for the inductor $L_2$ the crow bar current cannot build up.

The voltage time integral for the inductor $L_2$ may be influenced and controlled by the design of the inductor $L_2$ so if the recovery time of the diode D is known the inductor $L_2$ may be designed with a large enough voltage time integral to block the crowbar current during the reverse recovery time of the diode D. By "large enough voltage time integral" it is meant that the reverse bias voltage is remains large enough for a long enough time to block to crowbar current during the reverse recovery time of the diode D.

Primarily the inductor $L_2$ behaves as an "open circuit" as long as the current across the windings of the inductor $L_2$ is charging the inductor core PC. As soon as the core PC is saturated the magnetic flux through the core stops changing and the inductor $L_2$ behaves like a "short". Thus, when the switch S is open, the voltage across the inductor $L_2$ is initially equal to the source voltage. As the core charges up and saturates—a non linear process—the voltage across the windings of will drop. The integral—according the time—of the voltage across the winding W is referred to as the "voltage time integral" which is determined by the parameters of the inductor $L_2$ and is not influenced by any component, e.g. a resistor, connected in series with the inductor.

As shown in FIG. 2C, the energy storing element may combine one or more inductors with a diode in a parallel or series circuit. By way of example, and without loss of generality, the energy storage circuit 200C may include a "kickback" diode $D_K$ in series with a load R and in parallel with the energy-storing inductor $L_2$. The kickback diode $D_K$ prevents current from flowing through the load R when the switch S is closed, but allows the energy stored in the inductor $L_2$ to dissipate in the load when the switch S is open.

Figure 2D:
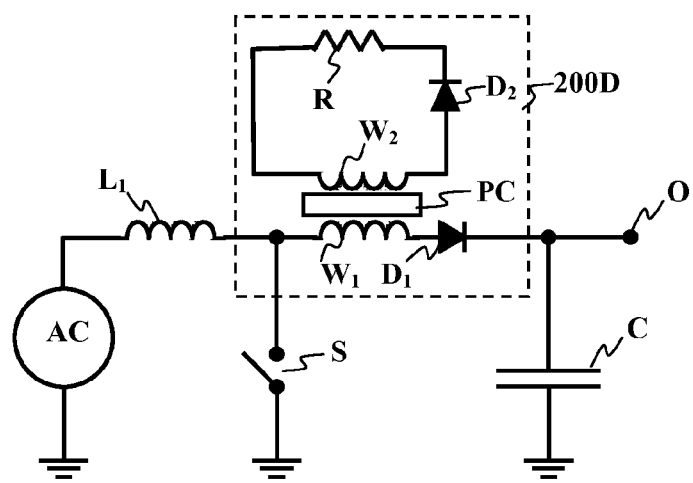
FIG. 2D schematically illustrates an energy-storing voltage regulating circuit applied to an improved power factor rectifier according to an embodiment of the present invention.

In a preferred embodiment, shown in FIG. 2D, an energy-storing voltage regulating circuit may include an energy storage circuit 200D having first and second windings $W_1$, $W_2$ each having a wire coil wound around a common magnetically permeable core PC. A winding $W_1$ is coupled to the switch S and a first diode $D_1$. The second winding $W_2$ is inductively coupled to the first winding $W_1$ through the permeable core PC. A second diode $D_2$ and an energy dissipating load R are coupled in series with the second winding $W_2$. In a preferred embodiment the two windings $W_1$, $W_2$ may be formed by winding a coaxial cable or twisted pair of wires around a common permeable core. In this way, the magnetic flux through both windings is always the same and leakage inductance is reduced.

Although the energy storage circuit 200D may look like a transformer, the circuit behaves differently than a typical transformer circuit. Generally speaking, in a transformer circuit there is normally current in both coils at any given time. In the energy storage circuit 200D, by contrast, energy is stored in the magnetic core PC due to current in the first winding $W_1$ coil and dissipated via the second winding $W_2$. The energy is stored as long as current flows through the first winding $W_1$. As soon as the current is interrupted an induced voltage will show up across the windings of both windings $W_1$, $W_2$. The voltage across the first winding $W_1$ is of a polarity that is opposite that of the crowbar current while the voltage across the second winding $W_2$ is of a polarity that drives a current through the second diode $D_2$ and the load R. It is noted that the load R may capture the energy store in the permeable core PC and utilize it. Thus, energy that would otherwise be wasted may be recovered.

In the energy storage circuit in FIG. 2D the first winding $W_1$ charges up the core PC and the second winding $W_2$ discharges the energy stored in the core PC. In this way it is possible to isolate the input from the output. The core PC gets charged or discharged always via the winding that conducts current. If neither of the windings conducts current a high voltage will show up across the ends of the windings, which could destroy circuit components connected to the windings.

Figure 2E:
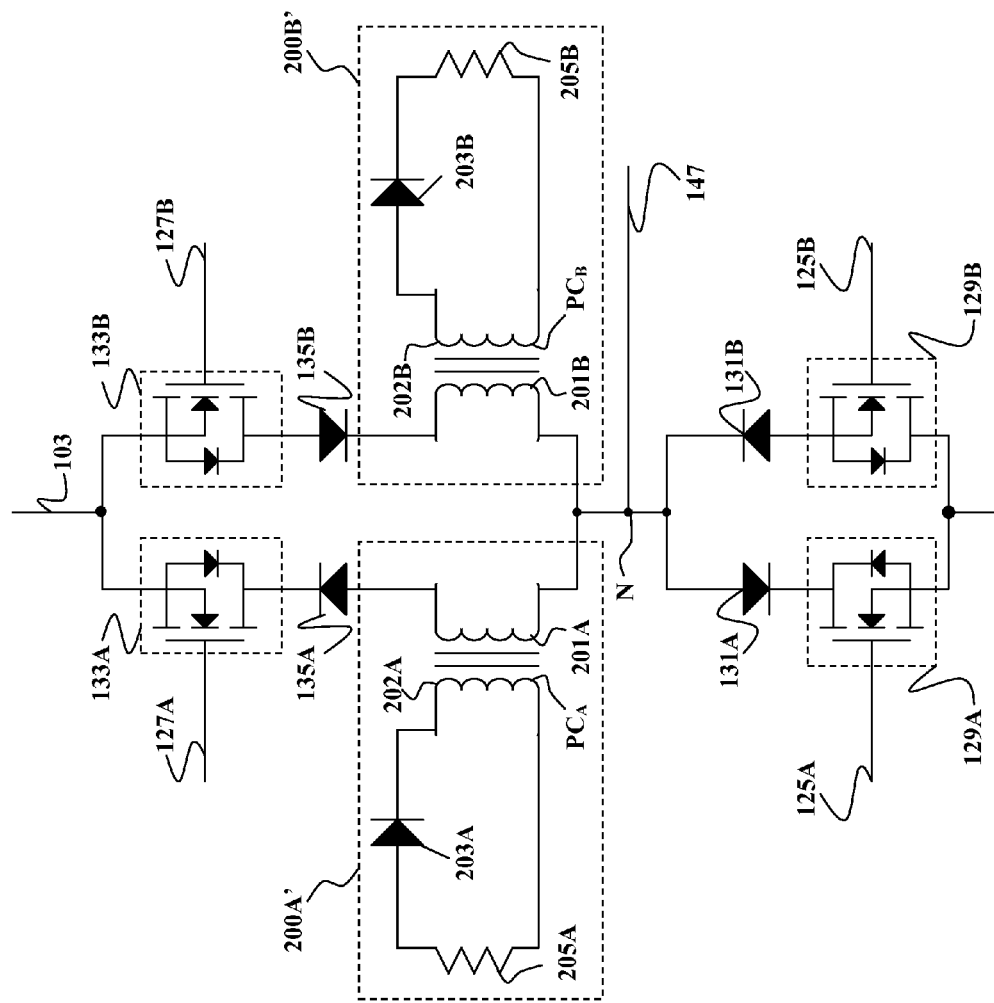
FIG. 2E is one illustration of an energy storage device according to an embodiment of the present invention.

Utilizing the principles discussed above with respect to FIG. 2D, by way of example, and not by way of limitation, a power factor correct may use two energy storage circuits 200A', 200B' that are configured as depicted in FIG. 2E. In this example, two separate energy-storing circuits of the type shown in FIG. 2D, one for each switching path of the voltage control circuit 145 are utilized. Each energy-storing system 200A', 200B' may include a primary winding 201A, 201B; a secondary winding 202A, 202B; a diode 203A, 203B; and a load 205A, 205B. Each primary winding 201A, 201B is magnetically coupled to the corresponding secondary winding 202A, 202B via a saturable magnetically permeable core $PC_A$, $PC_B$. The cores $PC_A$, $PC_B$ are charged by the first windings 201A, 201B, which are in series with the diodes 135A, 135B respectively. The cores $PC_A$, $PC_B$ are discharged by the second windings 202A, 202B, which are connected in series to the diodes 203A, 203B and loads 205A, 205B respectively.

The primary windings 201A, 201B are in the paths of switching devices 133A, 133B respectively. The diodes 203A, 203B and resistors 205A, 205B are connected in series to the secondary windings of the inductors 202A, 202B respectively. Each of the primary windings 201A, 201B in conjunction with its core is characterized by a voltage-time integral equal to or larger than a reverse recovery time of corresponding flywheel diodes 131A, 131B. Because of this property, the reverse recovery time of the flywheel diodes 131A, 131B is no longer a critical design parameter in the development of the voltage control circuit 145.

The voltage control circuit 145 works in conjunction with the energy storage devices 200A', 200B' of FIG. 2E as follows. While the current is being fed from the neutral line 105 through one of the switching devices 129A, 129B as well as through one of the flywheel diodes 131A, 131B to the output of the voltage control circuit 145, and while one of the switching devices 133A, 133B is turned on, the respective inductor 201A, 201B will prevent the build up of the crow bar current during the recovery time of the flywheel diode 131A, 131B by building up an inductive voltage that tends to oppose the crowbar current. Once the current path becomes de-energized, the energy stored in the inductor may be dissipated in a unipolar load (e.g. diode 203A in series with resistor 205A or diode 203B in series with resistor 205B). The energy stored in the inductors 201A, 201B need not be dissipated through a resistor. Alternatively, the energy stored by the inductor may be used to power auxiliary circuits to improve the system's overall efficiency.

The only inductance that has to be considered is that of the output filter inductor 137 since proper selection of the value of the capacitor 139 isolates the motor's inductance from affecting the voltage control circuit 145.

Figure 3A:
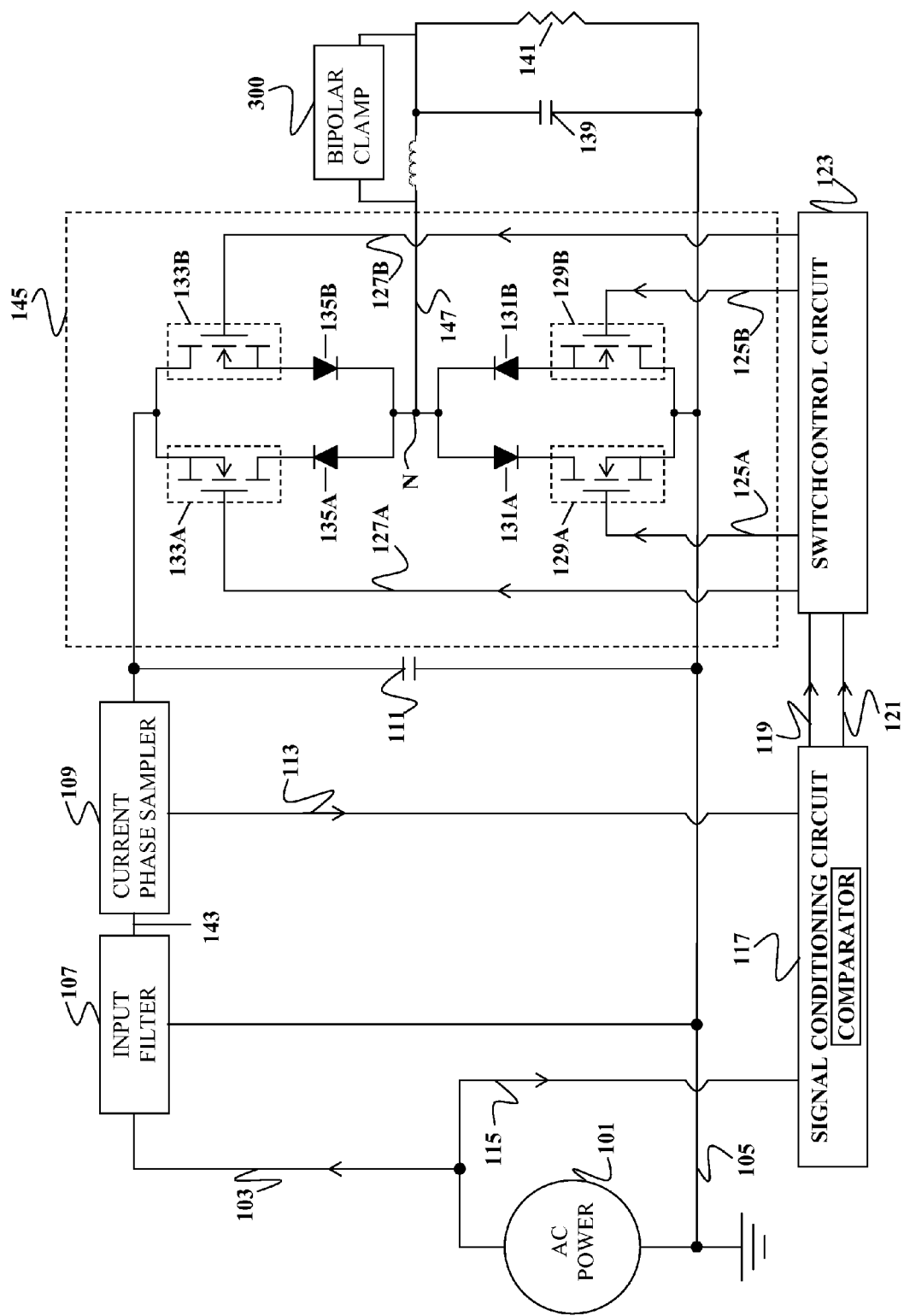
FIG. 3A is an electrical schematic diagram illustrating a power factor corrector according to an embodiment of the present invention with the addition of a bipolar clamp.

In a situation where a fast phase transient of the load impedance occurs due to a change in line voltage, an inductive "kickback" voltage could build up on the output filter's inductor 137. This may lead to a large voltage peak buildup in the voltage control circuit that could destroy the switching devices. To prevent the buildup of large voltage, a bipolar clamp 300 may be applied at the output 147 of the voltage control circuit 145 as shown in FIG. 3A. The bipolar clamp 300 acts to diffuse a buildup of a large voltage in the voltage control circuit 145 and protects the switches 133A, 133B, 129A, and 129B from burning out.

Figure 3B:
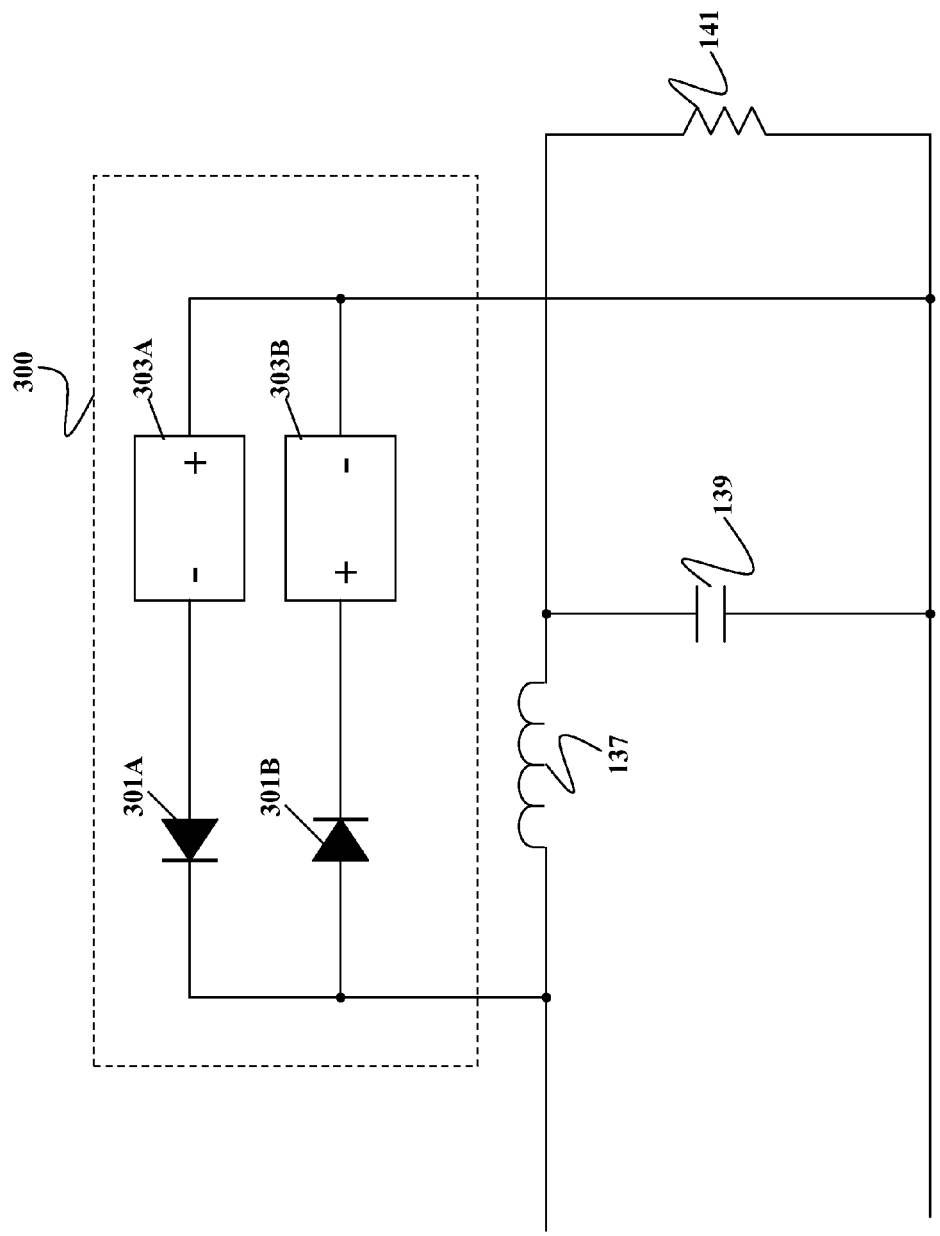
FIGS. 3B-3C are illustrations of examples of bipolar clamps that may be used in power factor correct circuits according to an embodiment of the present invention.

FIG. 3B illustrates an example of a bipolar clamp according to an embodiment of the present invention. By way of example, and not by way of limitation, the bipolar clamp 300 may be implemented through the use of two clamping diodes 301A, 301B and two bias sources 303A, 303B. The diodes 301A, 301B are of opposite polarity as are the bias sources 303A, 303B. The clamping diodes 301A, 301B are used in the rare situation where a fast transient signal makes its way through the voltage control circuit 145 (e.g., during system start up, or when there is a very fast and very large line voltage change). The bias sources 303A, 303B are configured such that their peak voltage outputs are greater than a maximum peak value of the line voltage 103. The bias sources 303A, 303B do not provide current, but instead are able to absorb a large amount of charge without affecting the functionality of the rest of the voltage control circuit 145. Depending on the polarity of the transient signal the diodes 301A, 301B will permit one of the two bias sources 303A, 303B to absorb the charge.

Figure 3C:
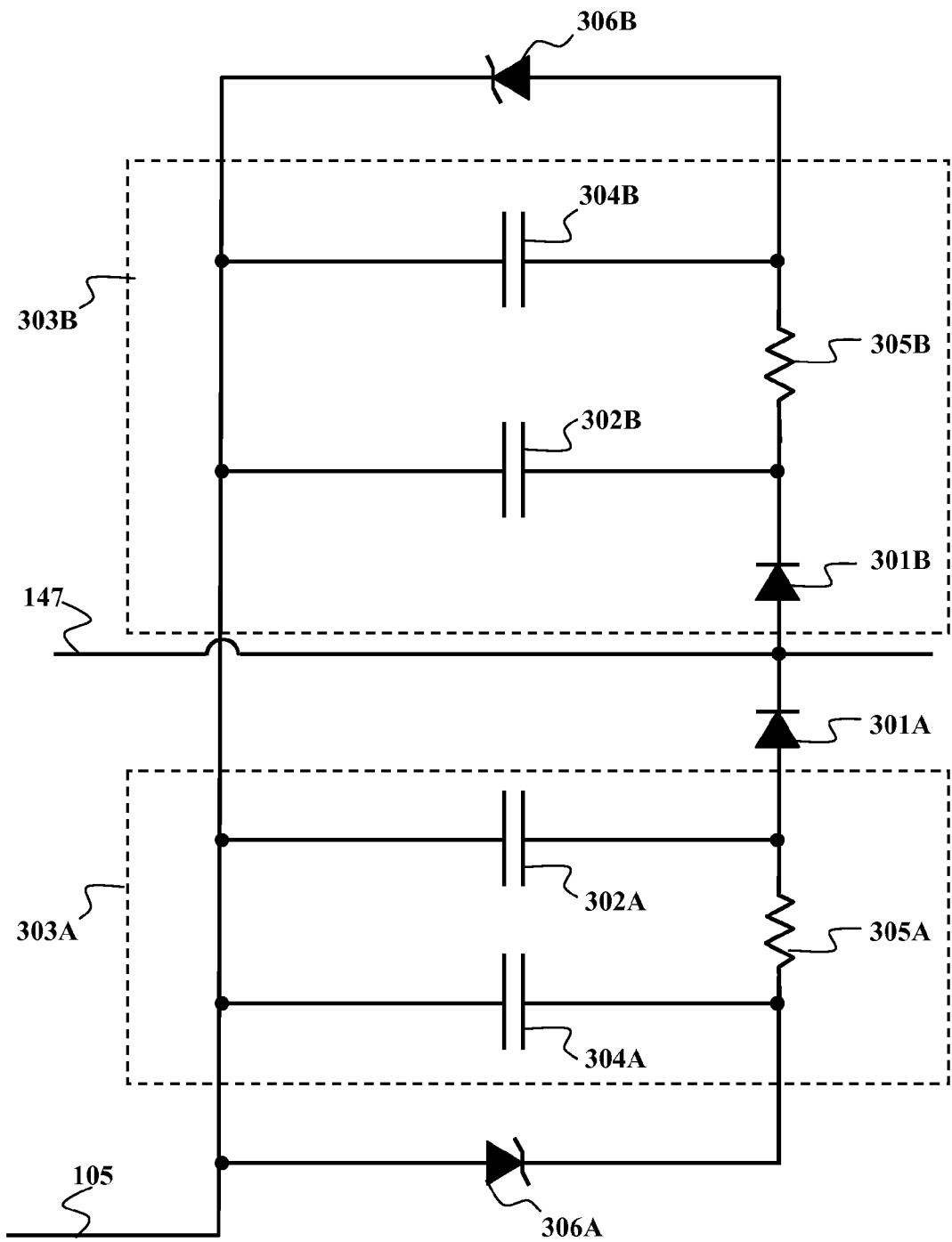

By way of example, as illustrated in FIG. 3C, the bipolar clamp 300 may include bias sources 303A, 303B containing first capacitors 302A, 302B, second capacitors 304A, 304B, resistors 305A, 305B, and threshold diodes 306A, 306B. As used herein, a "threshold diode" refers to a circuit element or combination of circuit elements that behave as a diode that conducts when a voltage across it is above a predefined threshold voltage. One example of a threshold diode, among others, is a Zener diode. A cathode of diode 301A and an anode of diode 301B are connected to the output 147 of the voltage control circuit 145. One terminal of capacitor 302A and resistor 305A are connected to the anode of diode 301A and one terminal of capacitor 302B and the resistor 305B are connected to the cathode of diode 301B. One terminal of capacitor 304A is connected to a second terminal of resistor 305A and one terminal of capacitor 304B is connected to a second terminal of resistor 305B. All four capacitors 302A, 302B, 304A, 304B have a second terminal connected to a common neutral line 105. The threshold diodes 306A, 306B are connected in parallel with capacitors 304A, 304B respectively. Although threshold diodes 306A, 306B are illustrated for the sake of example, any other circuit that behaves like a threshold diode may alternatively be used.

Operation of the bipolar clamp 300 may be understood by considering the following example. In bias source 303B, diode 301B and capacitor 302B may be regarded as a peak rectifier without load. Under normal conditions, e.g., a sinusoidal voltage at the output 147, diode 301B will charge up capacitors 302B and 304B to a peak value of the sinusoid voltage. As long as that peak value is constant diode 301B will practically not conduct. The threshold diode 306B is selected to have a threshold voltage slightly larger than the absolute maximum peak line voltage. Therefore, under normal circumstances the threshold diode 306B will not conduct. As soon as a large positive peak transient, e.g., having a voltage larger that the peak voltage that was stored on capacitor 302B, appears on the output 147 capacitor 302B starts to conduct and provides a low impedance path for the transient to the common neutral 105. Because capacitor 302B and diode 301B are in a low impedance path, and if the value of capacitor 302B is large enough to capture a few fast pulses, the resistor 305B and capacitor 304B can provide a discharge path for capacitor 302B as long the voltage on capacitor 302B is larger than the voltage on capacitor 304. If the transients last longer can be handled by the capacitors 302B, 304B, the threshold diode 306B will start to conduct. In some embodiments an optional resistor in series with the threshold diode may be used to provide one alarm signal for the control unit. For a negative transient pulse, diode 301B and bias source 303B implement a similar process utilizing capacitors 302A, 304A, resistor 305A and threshold diode 306A.

Figure 4:
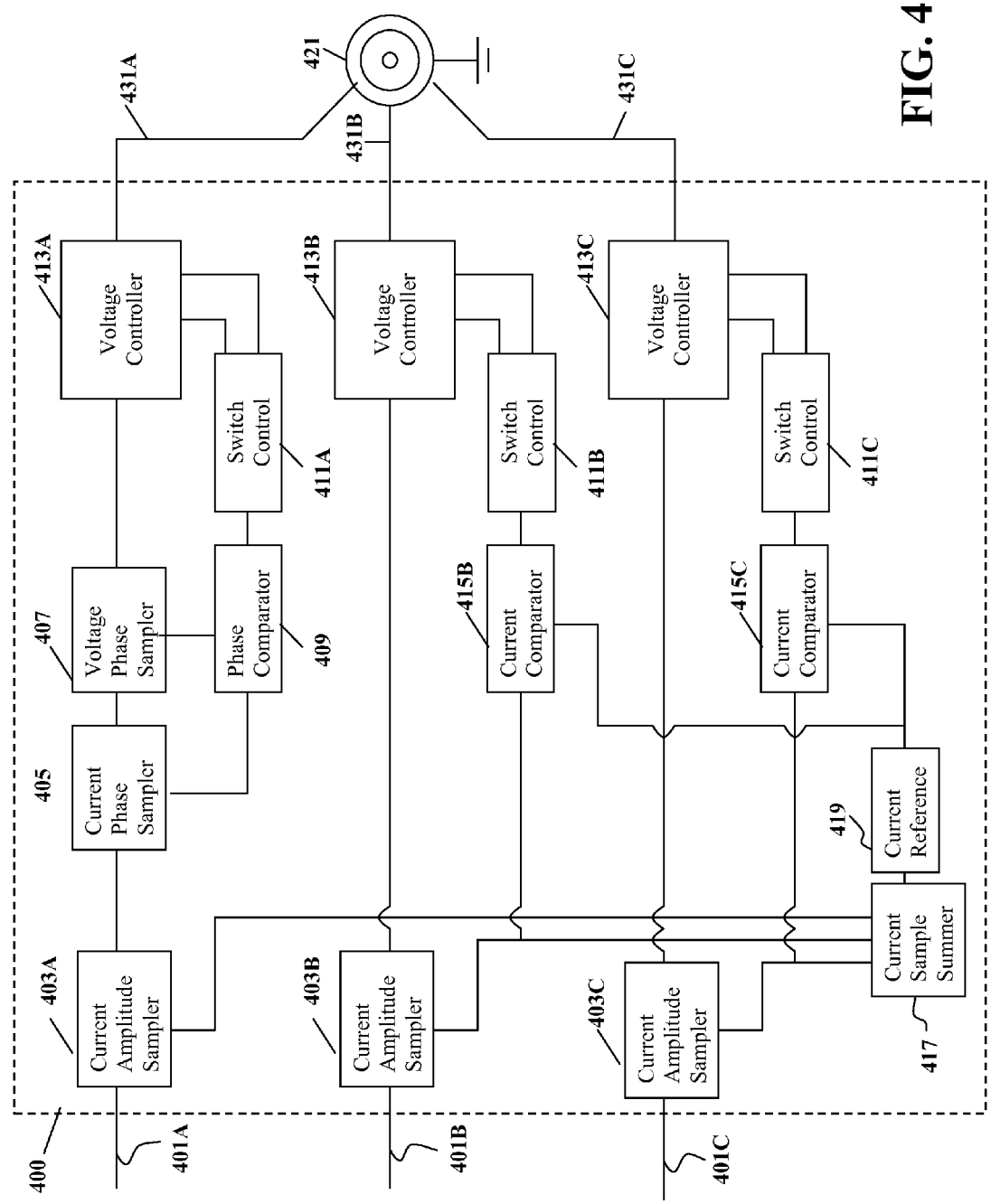
FIG. 4 is a block diagram illustrating a power factor corrector for a three-phase AC induction motor according to an embodiment of the present invention.

Embodiments of this invention are not limited to use with single-phase AC induction motors, and can be extended to operation with multi-phase induction motors, such as three-phase AC induction motors as shown in FIG. 4, which illustrates the use of a three phase power factor corrector system 400 for power factor correction in a three-phase induction motor 421 in accordance with an embodiment of the invention. For a three-phase AC induction motor, using the single-phase power corrector three times is possible, but not advisable because a three-phase AC induction motor without a load could run on a single phase. Because of this, the balance of one asymmetrical three-phase power line and a non-symmetrical motor would make the power factor corrector's system controls very complicated. However, there is a better scheme for controlling the power factor of a three phase motor that involves controlling the power factor in one phase, measuring the current in that phase, and using a current tracking system for the two remaining phases. The discovered fact, that a three phase unloaded motor could arbitrarily change the source of the driving current between the three phases is not documented in the relevant part of the AC motor literature. Balancing of the three phases was not a primary issue in the past. It is only after one looks particularly at balancing the three phases that this phenomenon is observed.

The actual power factor correction takes place in one of the phase voltages, e.g., phase of voltage 401A. The power factor correction in phase voltage 401A uses a current phase sampler 405 and voltage phase sampler 407 to sample phase information from the line supplying input voltage 401A, and further feeds this information to a phase comparator 409. The phase comparator 409 receives this voltage phase signal and current phase signal, and generates a phase signal proportional to the phase dislocation between the input voltage and input current. The phase comparator 409 may also generate an input voltage polarity signal in a manner analogous to that described above with respect to FIG. 1A. These signals are fed to a switch control circuit 411A, which processes this information and generates one or more pulse-width modulated polarity controlled switch control signals, as described above with respect to switch control circuit 123. These signals are then fed to the voltage control circuit 413A, which further converts this information into a sinusoid output voltage with an amplitude proportional to the duty cycle of the pulse width modulated chopper signal and mechanical load of phase voltage 401A of the motor 421. This sinusoid output voltage of the voltage control circuit 413A provides a first phase input voltage 431A of the motor 421 to maintain the power factor of this phase at an optimum level in a manner analogous to that described above with respect to the voltage control circuit 145. The voltage controller 413A may include an energy storage device and bipolar clamp, as discussed above.

The remaining two input phase voltages 431B and 431C may track the current of the first input phase voltage 401A, through the use of current amplitude samplers 403B, 403C. The three phase input voltages 401A, 401B, and 401C are received by the current amplitude samplers 403A, 403B, and 403C respectively. The current amplitude samplers 403A, 403B, 403C respectively receive AC voltages for first, second and third phase voltages 401A, 401B and 401C of an AC power input to the three-phase AC induction motor 421 and respectively produce the first, second and third current amplitude signals that are respectively proportional to current amplitudes of first, second and third phase voltages 401A, 401B and 401C.

The outputs of all three current amplitude samplers 403A, 403B, and 403C are input to a current sample summer 417. The current sample summer 417 adds together the outputs of all three current amplitude samplers 403A, 403B, and 403C and feeds this information to a current reference device 419. The current reference device 419 divides this signal by three and outputs this as a reference signal for current comparators 415B, 415C. The current comparators 415B, 415C are each configured to receive output of the current reference device 419 (i.e., the summed current amplitude signal divided by three). The first current comparator 415B also receives the second current amplitude signal from the second current sample 403B and outputs an amplitude difference signal proportional a difference between the second current amplitude signal and the output of the current reference device 419. The second current comparator 415C receives the current amplitude signal from the third current sampler 403C and outputs a second amplitude difference signal proportional a difference between the third current amplitude signal and the output of the current reference device 419.

These signals are fed to the respective switch control circuits 411B, 411C, each of which processes this information and generates one or more pulse-width modulated polarity controlled switch control signals for each phase. These signals are in turn fed into the respective voltage control circuits 413B, 413C, which further converts this information into sinusoid voltages with amplitudes proportional to the duty cycle of the pulse width modulated chopper signal and mechanical load of each respective phase of the motor. These sinusoid voltages provide second and third phase input voltages 431B, 431C of the motor 421 to maintain the power factor of each phase at an optimum level. Voltage control circuits 413A, 413B, 413C may be configured and may operate as described above with respect to FIG. 1 through FIG. 3B.

The configuration depicted in FIG. 4 has an advantage in that all three branches of the motor 421 will have equal current independent of the voltage asymmetry of the power system. Therefore, the power factor corrector system 400 delivers an equal load to all three phases while maintaining the power factor at an optimum level. Because the power factor correction loop and the current balancing loop are separated, the design of the system is less complicated.

As seen from the above discussion, embodiments of the present invention allow for power factor correction in AC induction motors while avoiding the disadvantages associated with prior art power factor correction systems. However, embodiments of the present invention are not limited to power factor correction. Embodiments of the invention may be used to implement voltage control with any type of AC voltage source and any type of load. In a particular embodiment, a voltage control circuit similar to that shown in FIG. 2A may be used, e.g., as a voltage stabilizer or step-down transformer.

Figure 5:
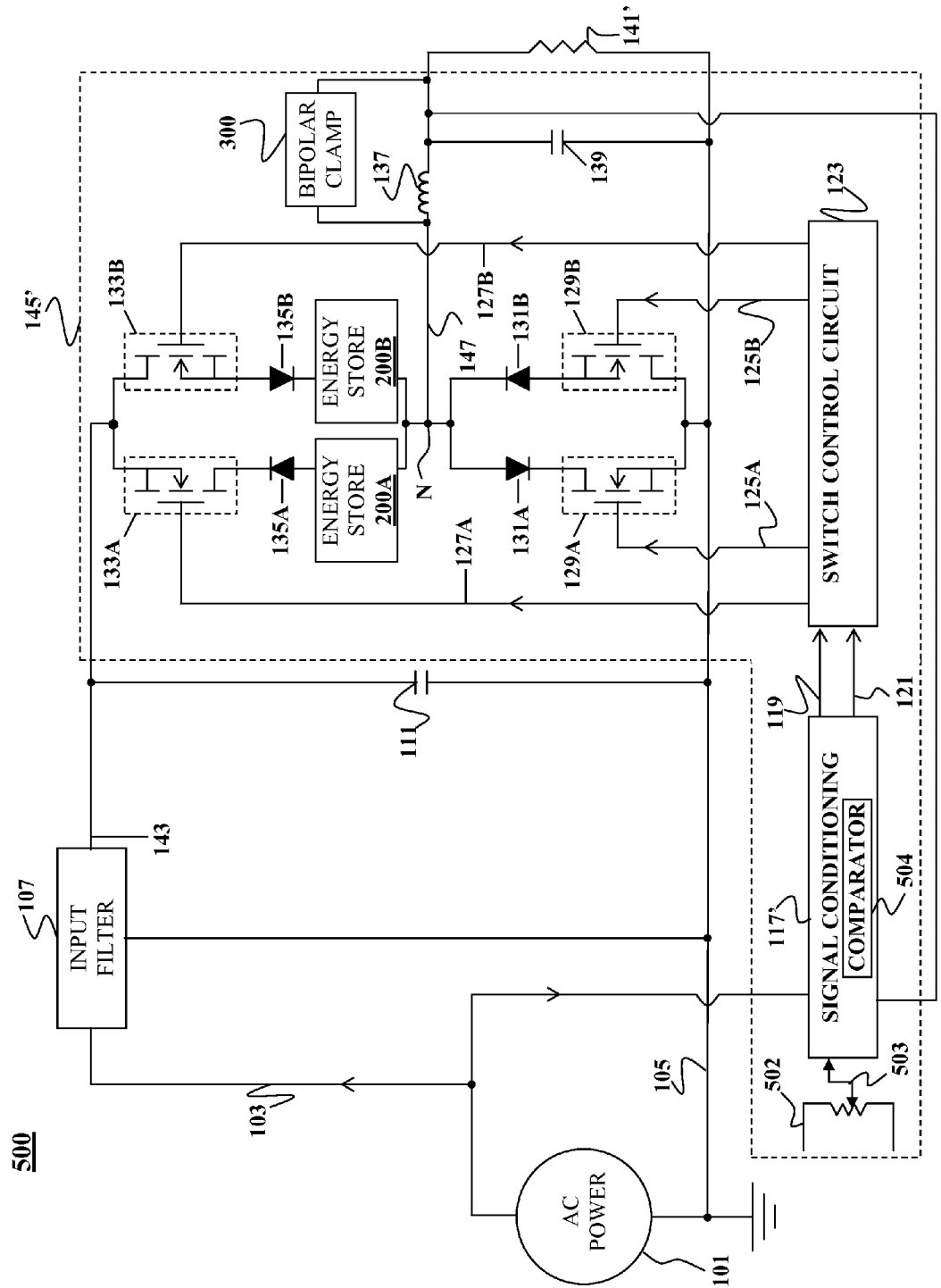
FIG. 5 is a schematic diagram illustrating use of a voltage control circuit according to an embodiment of the present invention as a transformer.

By way of example, and not by way of limitation, as shown in FIG. 5 a voltage control system 500 may include an input filter 107, coupled to a signal conditioning circuit 117' and switch controller 123 that are part of a voltage control circuit 145'. The voltage control circuit 145' may include switching devices 129A, 129B, 133A, 133B, diodes 131A, 131B, 135A, 135B which may be configured as discussed above with respect to FIG. 2A. The control circuit also includes energy storage circuits 200A, 200B, which may be configured as discussed above. An output voltage 147 derived from a voltage at a node N may be coupled to a load 141', which may be any type of load. An optional choke inductor 137 may be coupled between the node N and the load 141' and an optional capacitor 139 may be coupled in parallel with the load 141'. An optional bipolar clamp 300, which may be configured as described above, may be coupled in parallel with the inductor 139.

The switch control circuit 123 generates polarity control signals 125A, 125B and switch control signals 127A, 127B in response to a voltage control signal 119 and polarity signal 121 as described above. The voltage control signal adjusts the duty cycle of the switch control signals 127A, 127B. As discussed above, changing the duty cycle of the switch control signals 127A, 127B changes the magnitude of the output voltage 147 relative to the input AC voltage 103.

The signal conditioning circuit 117' samples the input AC voltage 103 from the AC source 101 and the output voltage. The signal conditioning circuit 117' also receives a voltage ratio input 503 from a source 502. By way of example, and not by way of limitation the voltage ratio source 502 is shown as being based on voltage source and a potentiometer. The signal conditioning circuit 117' produces the voltage control signal 119 and polarity signal 121. In the embodiment illustrated in FIG. 5, the signal conditioning circuit 117' compares the voltage ratio input 503 to a ratio of the output voltage 147 to the AC voltage 103 and adjust a value of the voltage control signal 119 to adjust a duty cycle of the chopping signals in response to the voltage ratio input in a way that changes the magnitude of the AC output voltage to minimize a difference between the voltage ratio input 503 and the ratio of the AC output voltage 147 to the AC input voltage 103. In this manner, the ratio of the output voltage 147 to the input voltage 103 may be made to track a desired ratio determined by the voltage ratio input 503. By way of example, and not by way of limitation, the signal conditioning circuit 117' may include a comparator 504 that compares the voltage ratio input 503 to the output/input voltage ratio and produces the appropriate voltage control signal 119.

By way of example, the comparator 504 may compare an RMS voltage ratio of the input and output voltages to a voltage ratio input 503 in the form of a DC voltage from the source 502. In such a case, the voltage control circuit 145' may behave as a step-down transformer. The transformer ratio of such a transformer may be adjusted simply by adjusting the voltage ratio input 503. The inventor has built and tested a 300-watt transformer of the type shown in FIG. 5. This transformer was shown to exhibit the expected behavior of a step-down transformer, i.e., decreased output voltage and increased output current. Furthermore, the transformer was roughly one one-hundredth the size and weight of a conventional transformer of the same power rating.

Applications of the control circuit 145' are not limited to transformers. For example, instead of comparing a DC voltage to a ratio of RMS values of the input and output voltages, the signal conditioning circuit may be configured to compare a time varying voltage ratio input 503 to a ratio of the instantaneous values of the input voltage 103 and output voltage 147. By way of example, the voltage ratio input 503 may be an AC reference voltage. In such a case, the signal conditioning circuit 117' may compare the AC reference voltage to the instantaneous ratio of the input and output voltages and produce a voltage control signal 119 that tends to stabilize waveform of the output voltage 147 relative to the reference AC voltage. In such an application, it is desirable for the frequency $f_c$ of the chopping signals 127A, 127B to sufficiently large compared to the frequency of the AC voltage 103, e.g., a factor of about thirty or greater.

As may be seen from the foregoing, embodiments of the present invention have numerous applications in the field of electric power. Embodiments directed toward power factor correction in AC induction motors can provide improved efficiency and reduced energy usage. Other embodiments directed toward voltage control allow for electrical components such as voltage controllers, voltage stabilizers and transformers that are lighter and more compact than conventional components. The savings in space and weight have a wide variety of applications in electrical and electronic equipment.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A voltage control circuit, comprising:
   a) a first and second solid state switching device each of which includes:
      i) an input terminal;
      ii) an output terminal;
      iii) a control terminal adapted to receive a chopping signal, wherein a value of the chopping signal determines whether electric current can flow between the input terminal and the output terminal;
   b) a first diode having an anode and a cathode and a second diode having an anode and a cathode, wherein the output terminal of the first switch and the input terminal of the second switch are adapted to receive an AC voltage, wherein the input terminal of the first solid state switching device is connected to the cathode of the first diode and the output terminal of the second solid state switching device is coupled to the anode of the second diode, wherein the anode of the first diode and the cathode of the second diode are electrically coupled to a node;
   c) a third and fourth solid state switching device, each having:
      i) an input terminal;
      ii) an output terminal;
      iii) a control terminal adapted to receive a polarity signal, but not the chopping signal, wherein the polarity signal has the same frequency as the AC voltage and is synchronous with the AC voltage, wherein a value of the polarity signal determines whether electric current can flow between the input terminal and the output terminal; and
   d) a third diode having an anode and a cathode and a fourth diode having an anode and a cathode, wherein the input terminal of the third solid state switching device is coupled to the cathode of the third diode and the output terminal of the fourth solid state switching device is coupled to the anode of the fourth diode, wherein the anode of the third diode and the cathode of the fourth diode are electrically coupled to the node, wherein the output terminal of the third switch and the input terminal of the fourth switch are adapted to couple to a neutral line of an AC source.

2. The voltage control circuit of claim 1, further comprising:
   e) an inductor having first and second terminals, wherein the first terminal is coupled to the node; and
   f) an output capacitor that is coupled to the second terminal of the inductor, wherein the output capacitor is configured to be coupled between the second terminal of the inductor and the neutral line, wherein the output capacitor and the inductor are configured to act as a low-pass filter that removes a frequency of the chopping signal but not a frequency of the AC voltage from an output voltage between the node and the neutral line.

3. The voltage control circuit of claim 1, further comprising a switch controller having one or more chopping signal outputs coupled to the control terminals of the first and second switching devices and one or more polarity signal outputs coupled to the control terminals of the third and fourth switching devices, wherein the switch controller is configured to receive a phase signal having a magnitude that is proportional to a phase dislocation between the AC voltage and related AC current and to configured to adjust a duty cycle of the chopping signal in response to the phase signal in a way that changes an amplitude of an AC output voltage at the node to reduce a phase dislocation between the AC voltage and the AC current.

4. The voltage control circuit of claim 2 wherein a frequency of the chopping signal is about 30 or more times greater than the frequency of the AC voltage.

5. The voltage control circuit of claim 2 wherein the circuit is configured to couple a load across the output capacitor between the neutral line and a junction between the output capacitor and the inductor.

6. A voltage control circuit, comprising:
a) a first and second solid state switching device each of which includes:
  i) an input terminal;
  ii) an output terminal;
  iii) a control terminal adapted to receive a chopping signal, wherein a value of the chopping signal determines whether electric current can flow between the input terminal and the output terminal;
b) a first diode having an anode and a cathode and a second diode having an anode and a cathode, wherein the output terminal of the first switch and the input terminal of the second switch are adapted to receive an AC voltage, wherein the input terminal of the first solid state switching device is connected to the cathode of the first diode and the output terminal of the second solid state switching device is coupled to the anode of the second diode, wherein the anode of the first diode and the cathode of the second diode are electrically coupled to a node;
c) a third and fourth solid state switching device, each having:
  i) an input terminal;
  ii) an output terminal;
  iii) a control terminal adapted to receive a polarity signal, wherein a value of the polarity signal determines whether electric current can flow between the input terminal and the output terminal; and
d) a third diode having an anode and a cathode and a fourth diode having an anode and a cathode, wherein the input terminal of the third solid state switching device is coupled to the cathode of the third diode and the output terminal of the fourth solid state switching device is coupled to the anode of the fourth diode, wherein the anode of the third diode and the cathode of the fourth diode are electrically coupled to the node, wherein the output terminal of the third switch and the input terminal of the fourth switch are adapted to couple to a neutral line of an AC source; and
further comprising a bipolar clamp coupled between the first terminal of the inductor and the neutral line, wherein the bipolar clamp comprises first and second clamp components coupled in parallel with each other, wherein:
a) the first clamp component comprises a first bias source coupled between a cathode of a first clamping diode and the neutral line, wherein the anode of the first clamping diode is coupled to the first terminal of the inductor; and
b) the second clamp component comprises a second bias source coupled between an anode of a second clamping diode and the neutral line, wherein the cathode of the second clamping diode is coupled to the first terminal of the inductor.

7. The voltage control circuit of claim 6 wherein the first and second bias sources each include one or more capacitors.

8. The voltage control circuit of claim 7 wherein the first and second bias sources include first and second threshold diodes, wherein each threshold diode is characterized by a threshold voltage that is larger than a peak value of the AC voltage.

9. A voltage control circuit, comprising:
a) a first and second solid state switching device each of which includes:
  i) an input terminal;
  ii) an output terminal;
  iii) a control terminal adapted to receive a chopping signal, wherein a value of the chopping signal determines whether electric current can flow between the input terminal and the output terminal;
b) a first diode having an anode and a cathode and a second diode having an anode and a cathode, wherein the output terminal of the first switch and the input terminal of the second switch are adapted to receive an AC voltage, wherein the input terminal of the first solid state switching device is connected to the cathode of the first diode and the output terminal of the second solid state switching device is coupled to the anode of the second diode, wherein the anode of the first diode and the cathode of the second diode are electrically coupled to a node;
c) a third and fourth solid state switching device, each having:
  i) an input terminal;
  ii) an output terminal;
  iii) a control terminal adapted to receive a polarity signal, wherein a value of the polarity signal determines whether electric current can flow between the input terminal and the output terminal; and
d) a third diode having an anode and a cathode and a fourth diode having an anode and a cathode, wherein the input terminal of the third solid state switching device is coupled to the cathode of the third diode and the output terminal of the fourth solid state switching device is coupled to the anode of the fourth diode, wherein the anode of the third diode and the cathode of the fourth diode are electrically coupled to the node, wherein the output terminal of the third switch and the input terminal of the fourth switch are adapted to couple to a neutral line of an AC source; and
further comprising an energy storing circuit coupled between the node and the anode of the first diode or between the node and the cathode of the second diode, wherein the energy storing circuit is configured to reduce a crowbar current in the third or fourth diodes during a reverse recovery time after a polarity of the polarity control signal changes.

10. The voltage control circuit of claim 9 wherein the energy storing circuit includes a storage inductor having a primary winding coupled between the node and the anode of the first diode or between the node and the cathode of the second diode and a magnetically permeable core inductively coupled to the primary winding, wherein the primary winding and core are selected such that a voltage time integral for storage inductor is characterized by a dissipation time for a reverse bias that is greater than a reverse recovery time of the first or second diode to which the primary winding is coupled.

11. The voltage control circuit of claim 10, further comprising a kickback diode coupled in parallel with the primary winding of the storage inductor.

12. The voltage control circuit of claim 10, further comprising a secondary winding that is inductively coupled to the core and a fifth diode and load coupled in series with the secondary winding, wherein the fifth diode is configured to prevent magnetic energy stored in the core from being discharged through the secondary winding when there is a current in the primary winding and to discharge magnetic energy stored in the core when there is no current through the primary winding.

13. The voltage control circuit of claim 9, further comprising a switch controller configured to receive a voltage control signal and a voltage polarity signal that depends on a polarity of the AC voltage and generate first and second polarity control signals coupled to the control terminals of the first and second solid state switching devices and generate first and second pulse-width modulated polarity controlled chopping control signals coupled to the control terminals of the third and fourth solid state switching devices, wherein a duty cycle of the chopping control signals depends on a value of the voltage control signal, whereby an AC output voltage that is derived from a voltage at the node depends on a value of the voltage control signal.

14. The voltage control circuit of claim 13, further comprising, a signal conditioning circuit coupled to the switch control circuit, wherein the signal conditioning circuit is configured to receive the AC voltage, the AC output voltage, and a voltage ratio input and produce the voltage control signal and the voltage polarity signal, wherein the signal conditioning circuit is configured to compare the ratio input to a ratio of the output voltage to the AC voltage and adjust a value of the voltage control signal to adjust a duty cycle of the chopping signals in response to the voltage ratio input in a way that changes the amplitude of the AC output voltage to minimize a difference between the voltage ratio input and the ratio of the AC output voltage to the AC voltage.

15. The voltage control circuit of claim 14, further comprising:
 e) an inductor having first and second terminals, wherein the first terminal is coupled to the node; and
 f) an output capacitor that is coupled to the second terminal of the inductor, wherein the output capacitor is configured to be coupled between the second terminal of the inductor and the neutral line, wherein the output voltage is a voltage at a junction between the inductor and the output capacitor.

16. The voltage control circuit of claim 9, wherein the energy storing circuit comprises:
 a first inductor having a first winding, a second inductor having a second winding, and a magnetically permeable core that magnetically couples the first and second windings, wherein the first winding is coupled between the node and the anode of the first diode or between the node and the cathode of the second diode.

17. The voltage control circuit of claim 16 wherein the first and second windings and core are configured such that a magnetic flux through the first and second windings is always the same.

18. The voltage control circuit of claim 17 wherein the first and second windings comprise a length of coaxial cable or twisted pair wire wrapped around the core.

19. A voltage control circuit, comprising:
 a) a first and second solid state switching device each of which includes:
  i) an input terminal;
  ii) an output terminal;
  iii) a control terminal adapted to receive a chopping signal, wherein a value of the chopping signal determines whether electric current can flow between the input terminal and the output terminal;
 b) a first diode having an anode and a cathode and a second diode having an anode and a cathode, wherein the output terminal of the first switch and the input terminal of the second switch are adapted to receive an AC voltage, wherein the input terminal of the first solid state switching device is connected to the cathode of the first diode and the output terminal of the second solid state switching device is coupled to the anode of the second diode, wherein the anode of the first diode and the cathode of the second diode are electrically coupled to a node;
 c) a third and fourth solid state switching device, each having:
  i) an input terminal;
  ii) an output terminal;
  iii) a control terminal adapted to receive a polarity signal, wherein a value of the polarity signal determines whether electric current can flow between the input terminal and the output terminal; and
 d) a third diode having an anode and a cathode and a fourth diode having an anode and a cathode, wherein the input terminal of the third solid state switching device is coupled to the cathode of the third diode and the output terminal of the fourth solid state switching device is coupled to the anode of the fourth diode, wherein the anode of the third diode and the cathode of the fourth diode are electrically coupled to the node, wherein the output terminal of the third switch and the input terminal of the fourth switch are adapted to couple to a neutral line of an AC source; and
 further comprising a first energy storing circuit coupled between the node and the anode of the first diode and a second energy storing circuit coupled between the node and the cathode of the second diode, wherein the first and second energy storing circuits are configured to reduce crowbar current in the third and fourth diodes during a reverse recovery time.

20. The voltage control circuit of claim 19 wherein the first energy storing circuit includes a first storage inductor having a first primary winding coupled between the node and the anode of the first diode and a magnetically permeable first core inductively coupled to the first primary winding, wherein the first primary winding and the first core are selected such that a voltage time integral for first storage inductor is characterized by a dissipation time for a reverse bias that is greater than a reverse recovery time of the first diode.

21. The voltage control circuit of claim 20, further comprising a first secondary winding that is inductively coupled to the first core and a fifth diode and first load coupled in series with the third winding, wherein the fifth diode is configured to prevent magnetic energy stored in the first core from being discharged through the first secondary winding when there is a current in the first primary winding and to discharge magnetic energy stored in the first core when there is no current through the first primary winding.

22. The voltage control circuit of claim 21, wherein the second energy storing circuit includes a second storage inductor having a second primary winding coupled between the node and the cathode of the second diode and a magnetically permeable second core inductively coupled to the second primary winding, wherein the second primary winding and the second core are selected such that a voltage time integral for second storage inductor is characterized by a dissipation time for a reverse bias that is greater than a reverse recovery time of the second diode.

23. The voltage control circuit of claim 22, further comprising a second secondary winding that is inductively coupled to the second core and a sixth diode and a second load coupled in series with the second secondary winding, wherein the sixth diode is configured to prevent magnetic energy stored in the second core from being discharged through the second secondary winding when there is a current in the second primary winding and to discharge magnetic energy stored in the second core when there is no current through the second primary winding.

24. An energy-storing voltage regulating circuit, comprising:
   a solid state switch;
   a capacitor; and
   an energy storage circuit and a first diode electrically coupled in series between the switch and the capacitor, wherein the energy storage circuit includes a first winding electrically coupled in series between the switch and the capacitor, a magnetically permeable core inductively coupled to the first winding, a second winding inductively coupled to the core, whereby the first and second windings are inductively coupled to each other through the core, a second diode and a load electrically coupled in series to the second winding, wherein the first winding and the core are selected such that a voltage time integral for first winding is characterized by a dissipation time for a reverse bias that is greater than a reverse recovery time of the first diode, and wherein the second diode is configured to prevent magnetic energy stored in the core from being discharged through the second winding when there is a current in the first winding and to discharge magnetic energy stored in the core when there is no current through the first winding.

25. The energy-storing voltage regulating circuit of claim 24 wherein the first and second windings and core are configured such that a magnetic flux through the first and second windings is always the same.

26. The energy-storing voltage regulating circuit of claim 25 wherein the first and second windings comprise a length of coaxial cable or twisted pair wire wrapped around the core.

* * * * *